United States Patent [19]

McFarland et al.

[11] 4,456,823
[45] Jun. 26, 1984

[54] MIXED GAMMA EMITTING GAS STANDARD AND METHOD

[76] Inventors: Robert C. McFarland; Patricia A. McFarland, both of 2393 Northside Pky., NW., Atlanta, Ga. 30327

[21] Appl. No.: 322,442

[22] Filed: Nov. 18, 1981

[51] Int. Cl.³ .................... G01D 18/00; G12B 13/00
[52] U.S. Cl. .................. 250/252.1; 73/864.86; 250/435
[58] Field of Search ............ 250/252, 428, 430, 435, 250/288; 73/864.85, 864.86, 864.87

[56] References Cited

U.S. PATENT DOCUMENTS

| | | | |
|---|---|---|---|
| 2,341,551 | 2/1944 | Hoover | 250/288 |
| 2,892,086 | 6/1959 | Carter, Jr. | 250/428 |
| 3,064,130 | 11/1962 | Ianni et al. | 250/252.1 |
| 3,195,355 | 7/1965 | Boyer et al. | 250/288 |
| 3,639,757 | 2/1972 | Caroll et al. | 250/288 |
| 4,286,155 | 8/1981 | Utting | 250/435 |

Primary Examiner—Craig E. Church
Assistant Examiner—T. N. Grigsby
Attorney, Agent, or Firm—William H. Needle

[57] ABSTRACT

A mixed gamma emitting gas standard in the form of a multiple isotope standard in a glass sphere which can be used to calibrate a gamma spectrometer system for gas counting in a wide energy range and without the need for any additional standards. Total and partial transfers of gas standard material to counting containers without leakage is enabled. The mixed gas standard is contained in a spherical vial equipped with ground glass stopcocks and a septum port in one tubular arm separated from the spherical vial by one stopcock. A gas transfer syringe, venting needle, assorted septa, and a length of hose are included with the spherical vial assembly to enable accurate volumetric transfers to several different gas counting geometries.

20 Claims, 7 Drawing Figures

MIXED GAMMA EMITTING GAS STANDARD AND METHOD

BACKGROUND OF THE INVENTION

Since radioactive gas emissions from nuclear power plants are the major contributor to the radiation dose of the population in the vicinity of these facilities, accurate measurements of the radioisotopes and activities in these gaseous emissions are very important. Table 1 is a list of the most important radioactive fission product gases found in gaseous effluents from nuclear power plants. Since the radioactive gas emissions contain a number of different radionuclides, an accurate identification and quantitative determination of the isotopes in the effluent must be performed using a gamma spectrometer system. Present day systems generally use high resolution semiconductor detectors rather than the poorer resolution NaI(Tl) detectors of earlier systems. The increased resolution of the modern semiconductor detectors has greatly improved the qualitative aspect of radioactive gas measurements. However, the wide variations in configuration and internal dimensions of the active volume of semiconductor detectors has increased the difficulty in performing quantitative measurements. The variation of detector efficiency with gamma ray energy, source shape, and source position relative to the detector must be measured for each individual detector. As shown in Table 1 the energy range of greatest interest in gaseous fission product monitoring is the region from 81 keV to 514 keV. The very rapid change in detector efficiency in this energy range requires that many efficiency measurements be performed for an accurate system calibration.

Many different types of containers are used in power plant laboratories to trap radioactive gases and hold them while radioactivity measurements are being made. Since the concentration of radioactive gas varies over several orders of magnitude depending on the position of collection in the power plant, a wide range of sizes of gas counting containers must be available. For low activity samples large containers of one to nine liters are commonly used in order to measure the concentration required by current regulations. High activity samples must be measured in small containers at large distances from the radiation detector so as not to exceed the count rate limitations of spect- rometer systems. Radioactive gas containers are made from a variety of materials. Plastics are inexpensive but have the disadvantage that radioactive noble gases diffuse through them in a matter of days. Metal containers retain the radioactive gases very well but are expensive and in general scatter and attenuate the gamma radiation to a greater degree than the plastic containers. In spite of their fragile nature, glass containers are frequently used in radioactive gas measurements. Glass containers vary in their ability to retain noble gases depending on the method used to seal them. Stopcocks made of glass can retain noble gases if they are properly used; and stopcocks are, in general, superior to rubber septum closures for gas retention. Each nuclear power plant with its unique effluent train environment and economic conditions uses a different combination of radioactive gas containers in its measurement process. The gamma spectrometer system used to assay radioactive gases must be calibrated to obtain the counting efficiency as a function of gamma ray energy for each separate container and each counting position before quantitative measurements can be performed.

TABLE 1

| RADIOACTIVE FISSION PRODUCT GASES | | |
|---|---|---|
| Isotope | Half-Life | Principal Gamma Ray Energies (keV) |
| Kr-85 m | 4.48 h | 149.5, 305 |
| Kr-85 | 10.76 y | 514 |
| Kr-87 | 76.4 m | 403 |
| Kr-88 | 2.80 h | 196, 2392 |
| Xe-133 m | 2.18 d | 232.8 |
| Xe-133 | 5.27 d | 81 |
| Xe-135 | 9.16 h | 249.6 |
| Xe-137 | 3.82 m | 455.6 |
| Xe-138 | 14.2 m | 258.2, 434.4, 1769, 2013 |

PRIOR ART

Prior to the present invention, gas counting system calibrations were performed following one of three methods. (1) A series of different single isotope gas standards could be used to calibrate across the energy field of interest. (2) Solid point sources could be used for system calibrations following the methods described by Hearn, McFarland, and McLain in *IEEE Transactions on Nuclear Science*, Vol. NS-23, No. 1, Feb. 1976, and by Coursey, Hutchison and Unterweger in *International Journal of Applied Radiation and Isotopes*, 1977, Vol. 28, pgs. 551–553, Pergamon Press, printed in Great Britain. (3) Calibrations were attempted using multi-isotope liquid sources and the correction factors calculated by Frigerio and Coley in *Analytical Applications of Isotopes and Radiation-II*. In practice, a number of problems have been encountered with these prior art methods, and solution of the problems has led to development of the present invention.

Single isotope gas standards have been commercially available in cylindrical or spherical flame sealed glass ampoules or in steel cylinders. Calibrations with single isotope standards can be very accurate if the standards can be transferred accurately to the appropriate counting containers. Complete calibrations across a broad energy range require many operations when using single isotope standards. Previous gas standard containers have suffered from several problems, however, The disadvantages of the flame sealed glass ampoules are the impossibility of transferring material accurately to small counting containers and the fact that transfer to large containers can only be accomplished by breaking the standard inside the container. Single isotope standards in steel cylinders have had problems with accurate transfers because of inaccuracies in pressure and volume measurements and the difficulty in either completely replacing the air in the counting container or in determining the fraction replaced.

Broad energy range gas calibrations can be performed using solid point sources. These calibrations are limited to spherical containers which can be represented by a point source at the center of the sphere. An additional problem is that this method is most accurate for high activity samples which can be counted a large distance from the detector. At activity levels typically encountered, the correction factors used in this type of calibration become very large and inaccurate.

SUMMARY OF THE INVENTION

Like the point source calibration discussed above, the method of Frigerio and Coley uses non-gaseous standards and theoretical correction factors to accomplish a broad energy range calibration for gas counting. Liquid sources are most commonly used and the correction factors are calculated using a Monte Carlo computer program. This type of calibration is limited to a few containers whose shapes can be mathematically described. The computations must be performed for each individual detector, and the internal dimensions of the active area of the detector must be accurately known. Correction factors for every combination of detector, container and counting position must be calculated. The need for a gas standard emitting gamma rays over a wide energy range which could be easily and accurately transferred to any type of counting container led to development of the present invention. The principle object of this invention is to provide a gas standard emitting gamma rays over a wide energy range which can be easily and accurately transferred to any type of counting container.

It is another object of this invention to provide a gas standard suitable for calibrating a gamma spectrometer system for gas counting in a wide energy range and without the need for any additional standards.

It is another object of this invention to enable total and partial transfers of gas standard material to counting chambers without leakage.

These objects are achieved by use of a spherical vial equipped with ground glass stopcocks and a rubber septum port in one tubular arm separated from the spherical vial by one stopcock. A gas sample transfer syringe having a needle on its barrel is used to penetrate through the rubber septum port for withdrawing volumetrically measured aliquots of gas.

DETAILED DESCRIPTION

Figure 1:
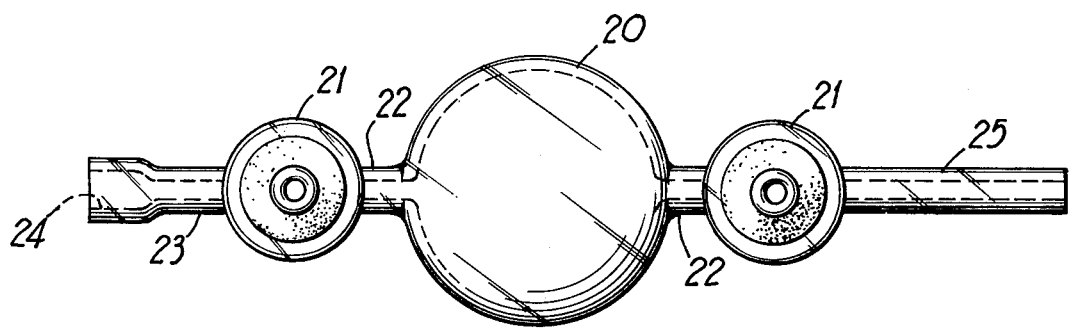
FIG. 1 is a plan view of a gas sphere and stopcock assembly embodied in the apparatus according to the invention.

A mixed gamma emitting gas standard according to the invention is a mixture of Xe-133, Xe-127 and Kr-85 in air at approximately one atmosphere pressure. This gas mixture provides gamma ray emissions for calibration at 81, 145, 172, 202, 375 and 514 keV. The mixed gas standard is contained in a modified 33 ml NBS counting vial 20 of spherical formation equipped with two ground glass stopcocks 21 whose bodies are joined to the vial 20 by short tube sections 22. A first tubular arm 23 on one stopcock 21 and coaxial with the tube sections 22 has an enlarged septum port 24 whose use will be further described. A second longer tubular arm 25 on the other stopcock 21 is also coaxial with the arm 23 and tube sections 22, and the common axis of the elements 22, 23 and 25 passes through the center of the spherical vial 20 and also bisects the two stopcocks.

Figure 3:
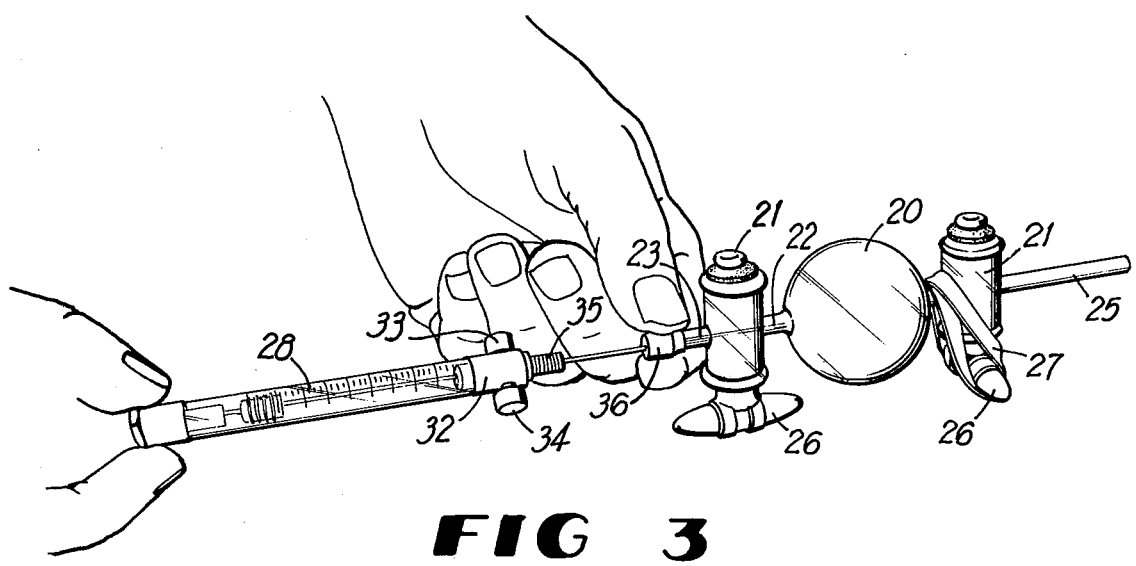
FIG. 3 is a perspective view of a gas transfer syringe as used with the sphere and stopcock assembly in making a partial transfer.

As shown in FIG. 3, the glass stopcocks 21 have opening and closing handles 26 and these handles may be restrained firmly in their closed positions by rubber retaining bands 27.

Figure 4:
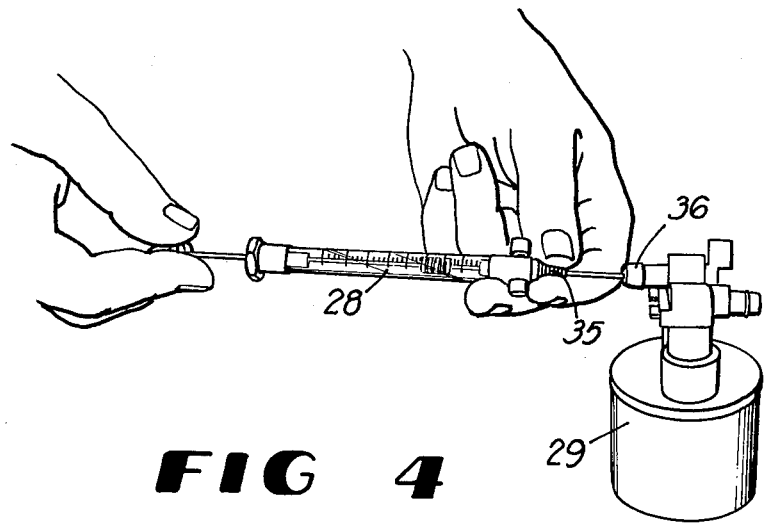
FIG. 4 is a further perspective view showing the syringe transferring gas to a smaller counting container.
Figure 6:
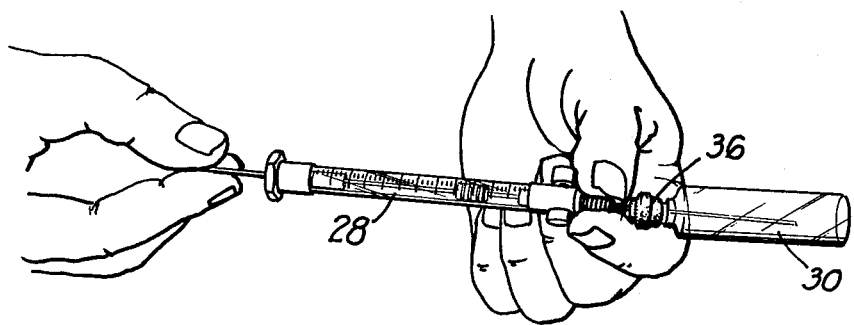
FIG. 6 is a perspective view showing the syringe transferring gas standard material directly into the body of a counting container.

The apparatus further comprises a gas syringe 28 which is employed to make a partial transfer of gas from the standard sphere 20 to a small gas counting container such as the container 29 in FIG. 4 or the container 30 in FIG. 6. This syringe is not required when making a total gas transfer from the sphere or vial 20 into a larger counting container, such as the container 31 shown in FIG. 2. The syringe 28 is equipped with a gas tight valve 32 which is actuated by red and green push buttons 33 and 34 on the syringe body. When the green button is depressed, the syringe valve is open, and when the red button is depressed, the valve is closed.

Figure 2:
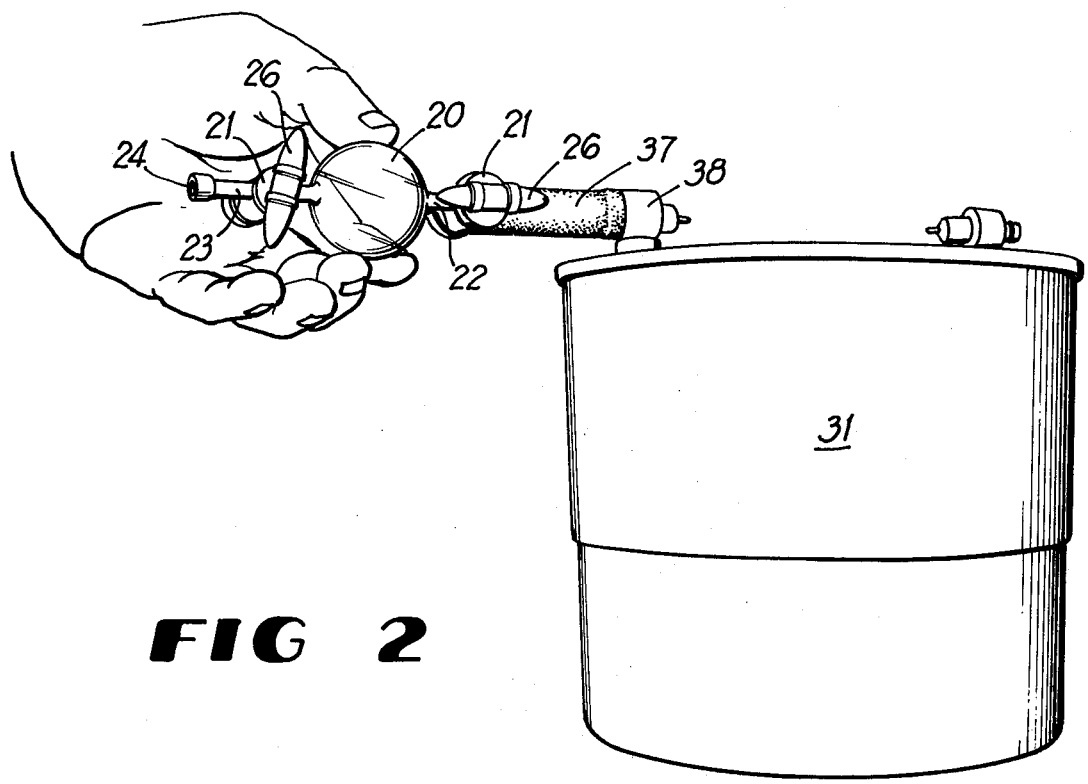
FIG. 2 is a perspective view showing the use of the glass sphere and stopcock assembly in relation to a counting container where a total transfer of the mixed gamma emitting gas standard is carried out.

A venting needle 35 is provided in the apparatus, for a purpose to be described, and variously sized rubber plugs or septa 36 are provided along with a short length of rubber hose 37, FIG. 2, used only for making a total transfer of gas into a larger counting container.

The ground glass socket normally found on the NBS vial has been removed in the present invention and that side arm of the vial has been fitted with the septum port 24 to facilitate gas transfers to a counting container using a gas syringe. The septum port 24 has an internal volume of less than 100 microliters which keeps possible gas losses to a negligible level. The septum port also is isolated from the vial or sphere 20 by the adjacent stopcock 21 so that septum leakage will not affect the gas standard.

Concerning the structure of the assembly shown in FIG. 1, the preferred material employed is Corning borosilicate glass. The sphere 20 measures $42.15 \pm 0.10$ mm O.D. The wall thickness of the sphere is $1 \pm 0.15$ mm. The tubular portions 22, 23 and 25 measure 7 mm O.D. and 3 mm I.D.

Calibration of the standard is accomplished in this modified container. An aliquot of uncalibrated gas, either a single isotope or a mixture, is placed in the sphere using a gas syringe. After mixing, the sphere is placed on a calibrated gas standard holder, and the activity is calibrated using a Ge(Li) gamma spectrometer system. The efficiency calibration of the Ge(Li) system including the holder is performed using point sources of Ba-133, Eu-152, and mixed gamma material inserted into the center of a glass sphere which is on top of the holder. Correction factors are calculated using the equations of Coursey, Hutchinson, and Unterweger to obtain the true gas counting efficiencies for this configuration. The calibration procedure is checked using NBS gas sphere standards for Xe-127 and Kr-85 and by exchanging samples of Xe-133 with the NBS. The most accurate calibration is obtained by first injecting the long lived components Xe-127 and Kr-85 and calibrating these isotopes on the Ge(Li) spectrometer before the addition of the short lived Xe-133. When the calibration is performed in this manner larger amounts of Xe-133 may be added in the final step without masking the other isotopes.

The total volume of each individual gas sphere must be determined so that the amount of activity withdrawn during use of the standard can be calculated. The volume of each sphere is calculated by determining the weight of degassed water required to fill the sphere and converting to volume using the known temperature vs. density relationship for water.

To perform a total transfer of mixed gamma gas standard to a counting container having a volume of 1 liter or greater, the following steps are taken in order:

(1) Check the container 31 into which the gas transfer is being made to make certain it is leakage-tight. Then draw a partial vacuum on the container 31 using a laboratory vacuum pump, being careful not to implode the container.

(2) Seal off the partially evacuated container 31 by closing its valves or stopcocks.

(3) Remove the rubber retaining bands 27 from the two stopcocks 21 of the standard sphere and stopcock assembly.

(4) Connect the open tube arm 25 of the sphere assembly to one container valve 38, FIG. 2, using the short hose section 37 previously described.

(5) Remove the rubber septum 36 from the other arm 23 of the sphere assembly.

(6) Open the valve 38 on the counting container 31.

(7) Open the stopcock 21 adjacent to the hose section 37.

(8) Fully open the other stopcock 21 remote from the container 31 to allow ambient air to flush through the sphere 20 into the counting container.

(9) When the counting container 31 has reached atmospheric pressure in several seconds, the valve 38 and both stopcocks 21 are closed and the sphere assembly is separated from the counting container.

(10) The contents of the container 31 is mixed thoroughly by swirling the container.

(11) The sphere 20 is counted on a gamma spectrometer to assure that all radioactive gas has been transferred.

(12) Gamma calibration is now carried out in accordance with known practice observing the proper handling precautions.

Figure 5:
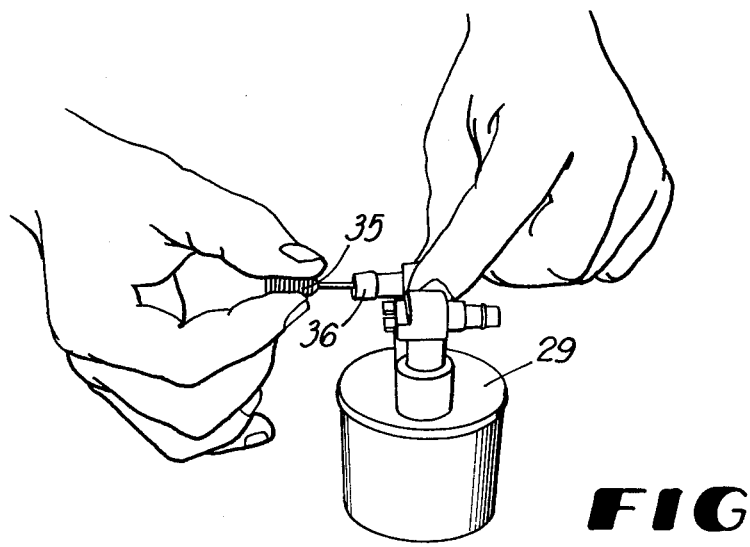
FIG. 5 is a similar view showing a venting needle used to sweep the gas standard material into the body of the counting container.
Figure 7:
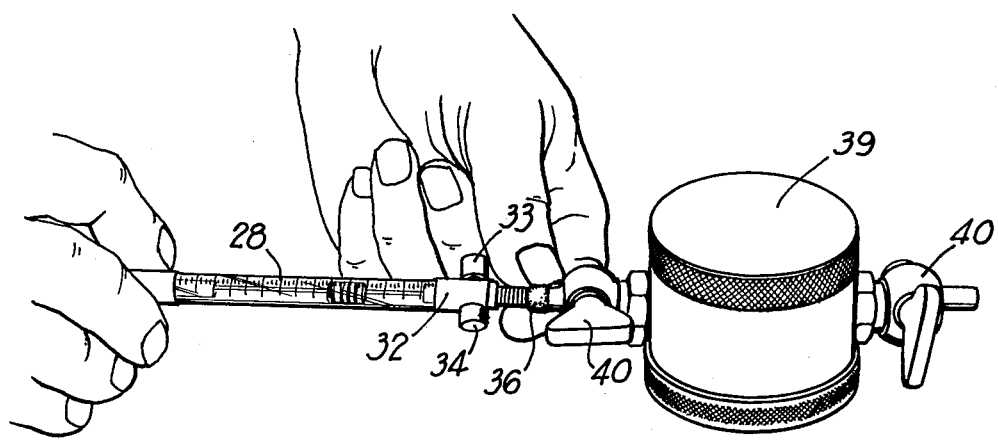
FIG. 7 is a similar view showing the syringe transferring gas standard material into a metal counting container equipped with side stopcocks.

For partial transfers of gas from the standard sphere to a smaller counting container (less than 1 liter of volume) of the types shown in FIGS. 5, 6 and 7, the rubber septum 36 is placed in the port 24 of the sphere assembly. To withdraw an aliquot of gas, the stopcock 21 between the septum 36 and sphere 20 is opened, and the needle of gas syringe 28 is inserted as far as possible through the septum and into the sphere assembly, FIG. 3. The syringe valve 32 is now opened by depressing the green button 34 following which the syringe plunger is pulled back about one-half of its full stroke. The plunger is returned forwardly in the syringe barrel to flush out the small amount of air in the needle. The syringe plunger is again retracted to withdraw exactly the desired volume of gas from the sphere 20, and about 30 seconds is allowed to elapse to equalize the pressure between the syringe and sphere. The syringe valve 32 is closed by depressing the red button 33 and the needle is withdrawn from the septum 36 while holding the latter in place on the arm 23 of the standard. The adjacent stopcock 21 is closed and the rubber retaining band 27 is applied to its handle 26.

Referring to FIG. 7, the counting container 39 is fitted with a rubber septum 36 upstream from one of its two valves 40. There is no need to evacuate the containers which allow the syringe needle to reach into the body of the container, such as the container 30 in FIG. 6. Other types of containers are partially evacuated, such as the container 29 in FIG. 4, where the syringe needle does not reach into the container body.

If the counting container has valves, as in FIG. 7, the valve 40 between the container body 39 and septum 36 is opened so that the gas standard material may be injected. The syringe needle is inserted as far as possible into the septum 36. The green button is depressed to open the valve 32 and the syringe plunger is pushed forwardly to inject the gas standard material into the counting container.

To completely flush gas from the syringe 28 into the container 39, the syringe plunger is retracted about one-half way and then returned forwardly while keeping the needle fully inserted in the counting container. Following this flushing, the needle is withdrawn from the septum 36.

If the counting container was partially evacuated before the gas transfer, FIGS. 4 and 5, the venting needle 35 should be inserted through the septum 36, FIG. 5, and ambient air allowed to sweep the gas standard material into the body of counting container 29. The venting needle should not be left in the septum for more than a few seconds, or back diffusion may result in loss of gas standard material. All valves on the counting container 29 or 39 are now closed and the contents of the container is mixed by swirling the container. The conventional gamma spectral analysis is now carried out.

A careful record is made of the volume of each aliquot withdrawn from the standard as well as a record of the container into which it is transferred. When performing multiple partial transfers, the sequence is carefully recorded since equal volumes of gas material withdrawn from the standard sphere at different times will not contain equal activities.

The following are calculations for partial transfer:

The sequence of transfers and the amount of each aliquot must be recorded even if an aliquot is not used when performing multiple transfers. After each transfer, the amount of material transferred should be calculated and the amount remaining in the sphere or vial 20 should also be calculated. For the first partial transfer, the activity transferred is given by $$A_T = \frac{V_A}{V_A + V_S} A_S \qquad (1)$$

where
$A_T$ = activity transferred
$A_S$ = activity in the sphere before this transfer
$V_A$ = volume of aliquot removed from the standard
$V_S$ = volume of standard sphere This calculation should be performed for each isotope in the standard.

The activity remaining in the sphere is $A_R = A_S - A_T$. If a second transfer is performed, the activity transferred in the second aliquot ($A_{T2}$) can be calculated using equation (1) if $A_S$ is replaced by $A_R$:

$$A_{T2} = \frac{V_A}{V_A + V_S} A_R$$

The activity remaining in the sphere after the second transfer will be $$A_{R2} = A_R - A_{T2}$$

Additional transfers can be calculated in a similar fashion. It is very important to remember to calculate the activity remaining in the sphere after each aliquot is removed even if the aliquot is not used for counting.

The invention offers several advantages over other standards available commercially, and it extends the range of container types that can be calibrated over the methods which use non-gaseous standards to obtain "fudge factors". Whether the standard is counted directly or transferred to other containers for counting, the inclusion of three gaseous isotopes with six major gamma ray emissions greatly reduces the time required to perform gas counting calibrations as compared to single isotope standard calibrations.

Other advantages result from the use of the modified NBS gas counting sphere. The use of the spherical container allows the standard to be accurately calibrated in the final container which eliminates sampling errors. Also, the spherical container assembly allows the standard to be easily checked for leakage after shipment by comparing the gamma emission rate to a point source in the center of a similar sphere.

The septum side arm 23, modified from the NBS sphere, is a most significant improvement in the mixed gamma emitting standard. During preparation of the standard, the septum port 24 is used to inject the individual isotopes so that the long lived components Xe-127 and Kr-85 may be more accurately calibrated before the addition of larger quantities of short lived Xe-133. The septum port allows gas standard material to be accurately transferred from the sphere to any gas counting container which can be fitted with a septum. The septum port 24 on the standard is separated from the sphere or vial 20 by a ground glass stopcock to prevent any possible leakage through the rubber septum during periods of storage. The short septum port allows gas sampling syringe needle to reach into the center of the sphere 20 to extract a truly representative portion of material for counting.

One embodiment of the present invention has the vial 20 containing 4 microcuries of Xe-133, 2 microcuries of Xe-127 and 150 microcuries of Kr-85. A further embodiment includes a mixed gamma emitting gas standard comprising 4 microcuries of Xe-133, 25 microcuries of Xe-131 m and 150 microcuries of Kr-85.

It is to be understood that the form of the invention herewith shown and described is to be taken as a preferred example of the same, and that various changes in the shape, size and arrangement of parts may be resorted to, without departing from the spirit of the invention or scope of the subjoined claims.

What we claim is:

1. A mixed gamma emitting gas standard, comprising: a precision spherical vial of predetermined volume, multiple mixed emitting gas components enclosed within said vial, and means for allowing the selective withdrawal from said vial of a predetermined amount of said components wherein said gas standard is used to calibrate a gamma spectrometer system for gas counting over a wide energy range without the use of additional standards.

2. A mixed gamma emitting gas standard as defined in claim 1, wherein said multiple mixed emitting gas components comprise selective amounts of Xe-133, Xe-127 and Kr-85.

3. A mixed gamma emitting gas standard as defined in claim 1, wherein said multiple mixed emitting gas components comprise selective amounts of Xe-133, Xe-131 m and Kr-85.

4. A mixed gamma emitting gas standard as defined in claim 1, wherein said gas components are mixed in air at one atmosphere of pressure.

5. A mixed gamma emitting gas standard as defined in claim 1, wherein said energy range is 81 KeV to 514 KeV.

6. A mixed gamma emitting gas standard as defined in claim 1, wherein said volume of said spherical vial is 33 ml.

7. A mixed gamma emitting gas standard as defined in claim 2, wherein the amount of said Xe-133 is 4 microcuries, the amount of said Xe-127 is 2 microcuries and the amount of said Kr-85 is 150 microcuries.

8. A mixed gamma emitting gas standard as defined in claim 3, wherein the amount of said Xe-133 is 4 microcuries, the amount of said Xe-131 m is 25 microcuries and the amount of said Kr-85 is 150 microcuries.

9. A gamma spectrometer calibration system for gas counting, comprising a precision volume spherical glass vial for receiving therein mixed multiisotope gas components, first and second tubular arms extending from said vial, each of said arms having a first end in flow communication with the interior of said vial and terminating in a second end, a ground glass stopcock on each arm intermediate said first end and said second end, each of said stopcocks movable to selectively communicate each of said second ends with said vial, and said second end on said first tubular arm being provided with a rubber septum port.

10. A gamma spectrometer calibration system as defined in claim 9, including a gas sample transfer syringe comprising a syringe barrel, a needle on said barrel adapted to penetrate through said rubber septum port and a syringe valve on said barrel movable between open and close positions relative to said needle, whereby volumetrically measured aliquots of said mixed multiisotope gas components may be withdrawn by said syringe through said rubber septum port and injected into a selected gas counting container in order to calibrate a gamma spectrometer system.

11. A gamma spectometer calibration system as defined in claim 9, and a flexible hose for use in making a total gas transfer from said spherical vial into a large gas counting container and having one end adapted to be telescoped onto said second end of said second tubular arm of said gas standard assembly and having its opposite end adapted to be in communication with an inlet fitting on said counting container.

12. A gamma spectrometer calibration system as defined in claim 9, wherein said gas components comprise selective amounts of Xe-133, Xe-127 and Kr-85.

13. A gamma spectrometer calibration system as defined in claim 9 wherein said gas components comprise selective amounts of Xe-133, Xe-131 m and Kr-85.

14. A gamma spectrometer calibration system as defined in claim 9, wherein said components are mixed in air at one atmosphere of pressure.

15. A gamma spectrometer calibration system as defined in claim 12, wherein said vial has a volume of 33 ml. and the amount of said Xe-133 is 4 microcuries, the amount of said Xe-127 is 2 microcuries and the amount of said Kr-85 is 150 microcuries.

16. A gamma spectrometer calibration system as defined in claim 13, wherein said vial has a volume of 33 ml. and the amount of said Xe-133 is 4 microcuries, the amount of said Xe-131 m is 25 microcuries and the amount of said Kr-85 is 150 microcuries.

17. A method of calibrating gamma spectroscopy systems for gas counting in a variety of counting containers comprising withdrawing a precision volume of a mixed gamma emitting gas standard from a precision volume vial containing the gas standard and delivering said withdrawn precision volume of the gas standard to the interior of a gas counting container.

18. The method of claim 17, and said withdrawing being performed with a gas syringe having a gas withdrawal and injecting needle and an opening and closing valve, said vial and said container having rubber-like septa adapted to be penetrated by the needle.

19. The method of claim 17, wherein said gas standard comprises Xe-133, Xe-127 and Kr-85 mixed in air at approximately one atmosphere of pressure.

20. The method of claim 17, wherein said gas standard comprises Xe-133, Xe-131 m and Kr-85 mixed in air at approximately one atmosphere of pressure.

* * * * *